3,814,677
PROCESS OF POLYMERIZATION
Hendrik Adrian Jacobus Battaerd, 3 Longbourne Ave., North Clayton, Victoria 3168, Australia; John Gannon Clouston, 24 Bungala St., Carff Park, New South Wales, Australia; and Philip William Moore, 10A Bruce Road, Menai, New South Wales, Australia
No Drawing. Filed Sept. 26, 1972, Ser. No. 292,274
Claims priority, application Australia, Sept. 28, 1971, 6,455/71
Int. Cl. C08f 1/16
U.S. Cl. 204—159.22                    6 Claims

ABSTRACT OF THE DISCLOSURE

A method of polymerizing a mixture containing from 3 to 100% of compounds containing two or more allyl groups which method comprises exposing said mixture to high energy irradiation at a temperature in the range from −80 to +120° C., preferably from 10° to 90° C. and at a pressure in the range from 1,000 p.s.i. to 100,000 p.s.i. and isolating the polymer salt so formed. The polymer product has improved ion exchange properties.

---

This invention relates to a process for the polymerization of allyl compounds.

It is known that with free radical initiators allylic compounds polymerize with difficulty only to give low molecular weight products (R. C. Laible, Chem. Rev. 58 (5), 807 (1958)). In this reaction polymerization is inhibited mainly by chain transfer reactions, such as degradative chain transfer. Because of this characteristic, massive amounts of initiator are usually required in allyl polymerizations, the resulting polymers have a low molecular weight and comprise relatively high quantities of terminal catalyst residues.

The free radical polymerization of allyl compounds such as the di- and tri-allyl monomers leads to cyclic structures by intra molecular polymerization as well as to network formation. The other mechanism characteristic of allyl polymerization, namely degradative transfer, is also operative. Consequently crosslinked polymers are obtained which exhibit residual unsaturation as well as measurable quantities of catalyst residues (Encyclopedia of Polymer Science and Technology, 1st Edition, Volume 1, page 755 and following).

The introduction of amino groups into allylic monomers further decreases the reactivity of the allyl bond in polymerization reactions. Thus, while for example allyl esters can be polymerized by heating in the presence of air, allylamine, diallylamine and triallylamine do not polymerize under conditions applicable to the allyl esters.

It was, however, found that allylamines can be polymerized under special conditions, e.g. in the gas phase (U.S. Pat. No. 3,062,798) or copolymerized when dialkyl peroxides are used as catalysts in conjunction with selected solvents (U.S. Pat. No. 3,057,833).

U.K. Pat. No. 907,079 proposes the production of homopolymers and copolymers of the N-triallylamine salts and N-tetraallyl ammonium salts using massive quantities of initiator; more specifically anion exchange resins can be made by polymerizing tetra-allyl ammonium chloride and triallylamine hydrochloride with large amounts of a free radical initiator (British Pat. No. 939,518).

These prior art polymers and processes have certain disadvantages. High doses of catalysts are required, e.g. in British Pat. 939,518 between 5 and 20 parts per 100 parts of monomer; consequently large amounts of hetero-atoms are retained in the polymer, e.g. 2½ to 5% by weight —$SO_3H$ groups, most probably chemically bound, in the polymer. This represents 0.3 to 0.6 meq./g. of a residual acid function which is undesired in a base resin. In line with this, prior art polytriallylamine resins so prepared have a neutralization capacity of less than 5.5 meq./g., well below their theoretical capacity. Furthermore these prior art polytriallylamines exhibit two other properties, somewhat surprising for a polymer of a trebly unsaturated compound; they have a lower than expected degree of crosslinking and a higher than expected degree of unsaturation. This has been explained, at least in qualitative terms, by Butler; he has shown (J.A.C.C., 77, 1767–9 (1955)) that monomers containing two allyl groups are subject to a cyclic polymerization which consumes one allyl group and leaves only one double bond per molecule for reaction in linear polymerization; a linear (or a largely linear) polymer results which is water soluble, i.e. non-swelling and not crosslinked. At least three allyl groups per monomer unit thus are required to attain crosslinking and insolubility. For the latter, tri-allyl resins, it has furthermode been postulated that an "incestous" tendency to interpolymerization exists (R. C. Laible, Enc. of Polymer Science and Technology I, p. 758) which causes a reduction in the number of double bonds available for crosslinking.

For certain processes the presence of even relatively small amounts of anionic groups in the amine resins is detrimental. Thus it has been found that certain of the prior art polymers of triallylamine prepared as described are thermally unstable. Thermal stability is, of course, a somewhat relative property. A convenient quantitative measure thereof may be derived from the differential scanning calorimeter, e.g. a Perkin Elmer DSC–1. Prior art polymers of triallylamines, when heated in this instrument at the rate of 64° C./min., decompose below 300° C. as evidenced by a decrease in their infra-red adsorption peaks at 910 and 980 cm.$^{-1}$.

From the point of view of use of these polymers in the so-called "Sirotherm" process (Sirotherm is a trademark of ICI Australia for thermally regenerable ion exchange resins) which is described in the publications:

"The 'Sirotherm' Demineralisation Process—an Ion Exchange Process With Thermal Regeneration," part 1. J. Inst. Engr. Aust. (1965) 37, 193;
"An Ion Exchange Process With Thermal Regeneration," Aust. J. Chem. (1966), 19, 561 (Part II), 589 (Part III), 765 (Part IV) and 791 (Part V);
"Thermally Regenerated Ion Exchange Process—An Aid to Water Management," J. Water Poll. Control Fed. (1966), 38, 1782; and Australian Pat. No. 274,029, it is even more significant that polymers of triallylamine made according to the prior art, e.g. British Pat. 939,518, are unsatisfactory. They have low capacities and, more importantly, do not satisfy the criterion for a satisfactory "Sirotherm" anionic resin, that the titration (pH) curve obtained on neutralization with a strong acid under standard conditions exhibits a pH plateau, i.e. an almost steady pH value over a major part of the titration curve (Austrailan Pat. 274,029). Weiss (Australian Journal of Chemistry, 1968, Vol. 21, pp. 2703–2710, "An Ion Exchange Process With Thermal Regeneration," Part VI) has shown that only resins with this characteristic are useful in his thermocycle. While we do not wish to be bound by theory we consider that the presence of the initiator residues, e.g. the residual sulphonic acid groups, may set up ionic grids which inhibit access and ion exchange and thus affect not only capacity but also thermal stability.

It has been found that these difficulties can be overcome and allylamine salts, particularly di- and tri-allyl-amine salts, can be satisfactorily homopolymerized or co-polymerized with other allylamine salts when ionizing radiation is used to activate polymerization.

It will be understood by those skilled in the art that, in order to polymerize in aqueous media, these amines must be present as salts. Hence all references in this specification to the polymerization of allylamine, even when not specifically described as salts, are to the amines in their polymerizable state. In aqueous media this will be as salts; only in certain concentrated hydrotropic solvent media such as $n$-toluenesulphonates can the allylamine bases be polymerized; these processes are exceptional but are embraced by the present invention.

It is known that the polymers so obtained have a free base content close to theory, e.g. in the case of triallylamine homo-polymer between 10 and 10.9% by weight of elemental nitrogen determined by elemental analysis are almost free from catalyst residues, i.e. contain less than 0.5% combined of the hetero-atoms sulphur, chlorine or oxygen (excluding, however, the oxygen attributable to the water content of the polymer); they are more highly crosslinked than the prior art poly(triallylamines) as evidenced by a low water regain value as defined below (swelling characteristics) between 0.1 and 1.3 g. per g. of resin for particles e.g. of mean diameter from 0.5 to 10 micron and the free bases of these polymers are stable as defined below on heating in a differential calorimeter up to 380° C., when heated at the rate of 64° C./minute. Furthermore in particulate form they have a high equilibrium capacity, between 6.5 and 8.6 meq./g. of resin, and when used in the "Sirotherm" process, satisfy the requirements for successful thermal cycling processes, namely they exhibit a pH plateau in their titration curve, which is characteristics of a virtually monofunctional polymeric amine, and are extremely resistant to disintegration, when used in a succession of several thousand ion exchange cycles.

The water regain value is defined as the amount of water in grams per gram of severely dried resin absorbed when the resin is equilibrated in distilled water. By severe drying we mean drying at 60° C. and 0.05 mm. Hg pressure over $P_2O_5$ for 24 hours. The polytriallylamine (free base) is considered stable at a given temperature if, after heating to said temperature at the stated rate, 6 mg. of the treated resin finely ground with 0.2 g. of dry KBr, formed under pressure into a disc and analyzed by infrared spectroscopy shows substantially no change in its absorption peaks at 910 and 980 cm.$^{-1}$ respectively.

Although the radiation initiated polymerization of allyl compounds is satisfactory we have now found a method which increases the yield of polymer for a given dosage of radiation. Also the polymerization occurs at a greater rate than that achieved by polymerization at atmospheric pressure.

Accordingly we provide a method of polymerizing a composition containing from 3 to 100% of compounds containing two or more allyl groups which method comprises exposing said composition to high energy radiation at a temperature in the range from —80 to +120° C., preferably from 10° to 90° C., and at a pressure in the range from 1,000 p.s.i. to 100,000 p.s.i. and isolating the polymer salt so formed.

Suitable compounds containing two or more allyl groups are, for example, triallylamine,
1,4-bis(N,N-diallylaminomethyl)benzene,
1,3,5-tris-(N,N-diallylaminomethyl)benzene,
N-(4-N,N-dimethylbenzyl)diallylamine,
N-(4-N,N-dimethylaminomethylbenzyl)diallylamine,
N-(4-N,N-diallylaminomethylbenzyl)diallylamine,
N-(4-N,N-dipropylaminomethylbenzyl)diallylamine,
N-(4-N,N-diisopropylaminomethylbenzyl)diallylamine, and
alkyldiallylamine.

The process may be carried out in a suitable pressure vessel, in the liquid phase, stirred, or nonstirred and as a continuous or as a batch process. The exact pressure used in our process is not critical but in general the rate of polymerization is approximately directly proportional to the pressure while the degree of cross-linking occurring in the polymer increases with pressure in a non-linear fashion. The properties of the polymers formed by our process may therefore be adjusted by changes in the temperature, and pressure of the process. The optimum conditions for the preparation of polymeric material having certain desired properties may be found as a result of simple experiments.

By high energy radiation we mean radiation having a wavelength less than 100 angstrom, in particular gamma- and beta-rays derived from isotopes or in the form of fast electrons such as produced by a Van de Graaff generator and an electron accelerator. Other sources of ionizing or high energy radiation are known in the art, e.g. from British Pat. No. 801,528, page 1, line 49–56; these include neutrons, accelerated heavy particles and X-rays or mixtures of them. A convenient practical source of high energy radiation is a cobalt 60 source.

The dose rate of irradiation controls the rate of initiation of the polymerization, but has little effect on the properties of the polymer formed, and does not substantially effect the yield. This is surprising as at atmospheric pressure the yield is dependent on the dose rate due to the normal bimolecular termination in a free radical polymerization reaction. At atmospheric pressure the higher the dose rate the lower the yield and therefore low dose rates, and in consequence long reaction times, are required to achieve a high yield. At pressures of between 1000 p.s.i. and 100,000 p.s.i. high dose rate may be used without significant reduction in yield. This has the advantage that short reaction times may be achieved without loss of efficiency. Dose rates between 10 rads/hr. and 5 megarads/hr. are operative and rates between 100,000 rads./hr. and 1 megarad/hr. are convenient in practice. To achieve short reaction times the dose rate is preferably in the higher part of this range, i.e. from 0.4 to 1 megarad/hr.

We prefer that the process of our invention is carried out at a pressure between 15,000 p.s.i. and 35,000 p.s.i.

The total dose delivered to the polymerization mixture affects the yield as well as the physical properties of the polymer produced. Doses from 0.1 megarad up to 20 megarad are operative; optimum yield of polymer is usually achieved at 0.5 to 15 megarad. At doses above 1 megarad the polymer formed has reduced residual unsaturation, possibly due to further cross-linking of the resin, as shown by the reduced water uptake values of the resin.

Radiation, usually and preferably, is carried out in an inert atmosphere such as nitrogen or argon. The presence of air does not stop the polymerization, but a reduction in yield and capacity is observed.

For use as ion exchange resins the polymers and copolymers of this invention must be produced within controlled particle size ranges. For this purpose precipitation polymerization and dispersion polymerization are preferred.

The precipitation polymerization of a triallylamine salt, e.g. the hydrochloride comprises polymerizing the monomer under irradiation in a binary liquid mixture consisting of a solvent for the monomer salt and the polymer salt such as water, and a non-solvent for the polymer salt such as dioxan or acetone; this leads to a product consisting of uniform spherical particles of a mean diameter from 0.5 to 10 micron, depending on the choice of the concentration of the monomer and the ratio and type of solvent to non-solvent. Copolymers of triallylamine with another allyl comer of similar particle size may be prepared in binary liquid systems in the same manner as that used for the manufacture of the homopolymer. For the system water-dioxan suitable ratios of solvent to non-solvent are from 0.2:1 to 1.5:1; in the system water-acetone suitable ratios of solvent to non-solvent are from 0.05:1 to 0.8:1. When a homopolymer of triallylamine is prepared using water as the solvent and acetone as a non-solvent, typical ratios of water to acetone are in the range from 0.06:1 to 0.6:1. When a copolymer of triallylamine and another allyl comer is prepared using this system a typical ratio of water to acetone is in the range from 0.2:1 to 0.6:1. Solvents suitable for the monomer salts and polymer salts are for example water, methanol, ethanol, dimethyl formamide, dimethyl sulphoxide and other aprotic solvents. Non-solvents suitable for the polymer salts of this process are exemplified by, but not limited to, dioxan, THF, acetone, methyl ethyl ketone, methyl butyl ketone. Other solvent pairs will be obvious to those skilled in the art.

Accordingly we provide a process for the precipitation polymerization of triallylamine or a triallylamine salt to form a polymer of quasispherical particles having a mean diameter from 0.5 to 10 microns, in a binary liquid mixture consisting of water and acetone, which process comprises exposing said mixture to high energy radiation at a temperature in the range from −80 to +120° C., preferably from 10° to 90° C., and at a pressure in the range from 1,000 p.s.i. to 100,000 p.s.i.

We also provide a process for the precipitation copolymerization of triallylamine or a triallylamine salt with another allyl or allyl salt co-monomer as hereinbefore defined to form a copolymer of quasispherical particles having a mean diameter from 0.5 to 10 microns, in a binary mixture consisting of water and acetone, which process comprises exposing said mixture to high energy radiation at a temperature in the range from −80 to +120° C., preferably from 10° to 90° C., and at a pressure in the range from 1,000 p.s.i. to 100,000 p.s.i.

For larger beads, equivalent to the conventional ion exchange resins, the dispersion polymerization process is preferred. For example a dispersion of an aqueous triallylamine hydrochloride solution in benzene stabilized with ethyl cellulose when irradiated at room temperature with $Co^{60}$ gamma-rays, will give a high yield of ion exchange beads with a capacity of 6.9 meq./gr. The size of the beads depends on the concentration of ethyl cellulose, the triallylamine hydrochloric solution, the stirring rate and the geometry of the reaction vessel. Beads between 200 mesh BSS and 10 mesh BSS can easily be achieved. The choice of suspension medium is not narrowly critical, provided the medium is not miscible with the triallylamine hydrochloride solutions. The choice of the stabilizer is not critical; most surfactants used in dispersion polymerization, e.g. hydrocarbon soluble amines or quaternary ammonium terminated surface active agents as well as cellulose ethers are suitable.

This invention is now illustrated by, but by no means limited to the following examples:

EXAMPLE 1

A 15% w./v. solution of triallylamine hydrochloride was prepared in a mixture consisting of 1 part by volume of water to 4 parts by volume of acetone. Samples of this solution were irradiated at 25° C. and at a dose rate of 58,000 rad/hour. The total dose delivered to each sample and the pressure were as shown in Table 1. After irradiation the product comprising approximately spherical particles was filtered off and washed thoroughly. The yield of polymer calculated on the monomer used and the water regain value of each produce were as shown in Table 1. The water regain value was measured in the following general manner.

About 0.5–1.0 gms. of the dry resin was placed in a filter tube fitted with a sintered glass disc of porosity about 2. 20 bed volumes of N.HCl were passed through this material in not less than 30 minutes, followed by a rinse with N/1000 HCl until the pH of the effluent acid was approximately the same as the wash acid, i.e. pH 3.

The resin was then centrifuged for exactly 30 minutes at 4000 r.p.m. and then weighed in the filter tube (A). The tube containing the resin was dried at 60° C. in a vacuum oven to constant weight cooled and reweighed (B).

The resin was then removed from the sintered glass tube. The tube was weighed dry (C), then immersed in a dilute solution of "Lissapol" NX (Lissapol is a trademark for a polyalkoxide), centrifuged for 10 minutes under the same conditions as given above. The tube was reweighed (D). The water regain was calculated in the following manner.

From the apparent wet weight of the resin (A−D) gms. subtract 0.02 gms. per gm. of wet resin as a correction for water held between the beads to give the corrected weight of (E) gms. The weight of the dry resin=(B−C) gms., and the loss of weight on drying (i.e. the weight of the water=E−(B−C) gms.

$$\text{Water regain} = \frac{E-(B-C)}{(B-C)}$$

gm. water per gm. of dry resin.

Hence—

TABLE I

| Experiment number | Pressure (p.s.i.) | Total irradiation dose (Mrad) | Yield, percent | Water regain, g. H₂O/g. resin |
|---|---|---|---|---|
| 1 | 15 | 0.23 | 5.3 | |
| 2 | 20,000 | 0.23 | 8.6 | |
| 3 | 15 | 0.96 | 24.1 | 3.4 |
| 4 | 20,000 | 0.96 | 32.4 | 3.3 |
| 5 | 15 | 1.73 | 35.6 | 2.8 |
| 6 | 15 | 2.32 | 35.8 | 2.7 |
| 7 | 20,000 | 2.32 | 74.6 | 2.2 |

EXAMPLE 2

This example illustrates the effect of dose rate. Monomer solutions were prepared and the polymer yield determined exactly as described in Example 1. The radiation temperature was 25° C. in experiments 8 to 11 inclusive. The samples were irradiated to a total dose of 1 megarad at 4 dose rates and the pressure employed was 20,000 p.s.i. The yields obtained at each dose rate are shown in Table II. It may be seen from Table II that the yield is substantially independent of the dose rate at 20,000 p.s.i.

TABLE II

| Number | Dose rate, rads/hr. | Polymer yield, percent |
|---|---|---|
| 8 | 36,850 | 27.5 |
| 9 | 65,300 | 17.8 |
| 10 | 203,000 | 27.2 |
| 11 | 639,000 | 25.6 |

EXAMPLE 3

This example demonstrates the effect of temperature and total dose at a fixed dose rate and a fixed pressure on the yield and degree of crosslinking.

The procedure of Example 1 was followed. The dose rate was fixed at 0.21 megarads/hr. and the pressure was maintained at 3,000 atmospheres. The results are given in Table III.

These results show that both the rate of polymerisation and the degree of crosslinking are temperature sensitive. At 3,000 atmospheres the optimum rate of polymerisation and of crosslinking is reached at about 60° C.

TABLE III

| Number | Total time of dose, hrs. | Dose rate, M./hr. | Total dose, Mrad. | Temperature, °C. | Pressure, kg./cm.² | Percent yield | Water regain[1] |
|---|---|---|---|---|---|---|---|
| 12 | 15 | 0.21 | 3.15 | 62 | at. | 3.8 | 3.63 |
| 13 | 15 | 0.21 | 3.15 | 2-10 | 750 | 26.9 | 2.82 |
| 14 | 15 | 0.21 | 3.15 | 60-65 | 3,000 | 39 | 1.291 |
| 15 | 8 | 0.21 | 1.68 | 62 | 3,000 | 1.9 | 3.11 |
| 16 | 11 | 0.21 | 2.3 | 62 | 3,000 | 16 | 2.02 |
| 17 | 18 | 0.21 | 3.8 | 2-10 | 3,000 | 41 | 2.82 |
| 18 | 7 | 0.21 | 1.47 | 2-10 | 3,000 | 24.5 | 3.18 |
| 19 | 12 | 0.21 | 2.5 | 2-10 | 3,000 | 37.8 | 2.97 |
| 20 | 5 | 0.21 | 1.05 | 37 | 3,000 | 13.2 | 3.35 |
| 21 | 16 | 0.21 | 5.15 | 32 | 3,000 | 48.0 | 2.46 |
| 22 | 8 | 0.21 | 1.63 | 33 | 3,000 | 31.6 | 2.93 |
| 23 | 5 | 0.21 | 1.05 | 77 | 3,000 | Soluble | |
| 24 | 21 | 0.21 | 4.41 | 77 | 3,000 | 52.1 | 1.71 |
| 25 | 15 | 0.21 | 3.15 | 77-79 | 3,000 | 31.1 | 2.44 |
| 26 | 12 | 0.21 | 2.52 | 77 | 3,000 | 8 | 2.96 |

[1] G. H₂O/g. dry resin.

EXAMPLE 4

The procedure of Example 3 was repeated exactly except the pressure was 30,000 p.s.i. and the dose rate was 58,000 rads/hr. The results are given in Table 4.

The results show an optimum in yield and crosslinking. The crosslinking reaction proceeds faster at higher temperature (25° C.) and the polymerization seems to be slightly favored by lower temperatures. At the low dose rate of 58,000 rads/hr. operation at 25° C. appears to give the desired optimum compromise.

TABLE IV

| Number | Temp., °C. | Total dose, megarad | Polymer yield, percent | Water regain |
|---|---|---|---|---|
| 27 | 35 | 1.7 | 26 | N.d. |
| 28 | 35 | 2.5 | 45 | N.d. |
| 29 | 35 | 3 | 50 | N.d. |
| 30 | 25 | 0.7 | 16 | N.d. |
| 31 | 25 | 1 | 22 | N.d. |
| 32 | 25 | 2.3 | 58 | 3.8 |
| 33 | 25 | 2.8 | 72 | 2.0 |
| 34 | 25 | 3.7 | 87 | 1.5 |
| 35 | 25 | 4.6 | 87 | 1.3 |
| 36 | 15 | 1.6 | 52 | 2.9 |
| 37 | 15 | 2.2 | 63 | 2.8 |
| 38 | 15 | 2.8 | 71 | 2.2 |
| 39 | 15 | 4.6 | 88 | 1.8 |
| 40 | 9 | 1.6 | 51 | 4.4 |
| 41 | 9 | 2.2 | 64 | 4 |
| 42 | 9 | 2.8 | 71 | 3.2 |

We claim:
1. A method of polymerizing a composition containing from 3 to 100% of compounds containing two or more allyl groups selected from the group consisting of triallylamine,
1,4-bis(N,N-diallylamino-methyl) benzene,
1,3,5-tris(N,N-diallylaminomethyl) benzene,
N-(4-N,N-dimethylbenzyl) diallylamine,
N-(4-N,N-dimethylaminomethylbenzyl) diallylamine,
N-(4-N,N-diallylaminomethylbenzyl) diallylamine,
N-(4-N,N-dipropylaminomethylbenzyl) diallylamine,
N-(4-N,N-diisopropylaminomethylbenzyl) diallylamine, and
alkyldiallylamine,
which method comprises exposing said composition to high energy radiation at a dose rate of between 100,000 rads/hr. and 1 megarad/hr. at a temperature in the range from −80 to +120° C. and at a pressure in the range from 1,000 p.s.i. to 100,000 p.s.i. and isolating the polymer salt so formed.

2. A process according to claim 1 wherein the dose rate is between 0.4 megarads/hr. and 1.0 megarads/hr.

3. A process according to claim 1 wherein the temperature is in the range from 10 to 90° C.

4. A process according to claim 1 wherein the pressure is in the range from 15,000 p.s.i. to 35,000 p.s.i.

5. A process according to claim 1 for the precipitation polymerization of triallylamine or a triallylamine salt to form a polymer of quasispherical particles having a mean diameter from 0.5 to 10 microns, wherein the reaction is carried out in a binary liquid mixture consisting of water and acetone.

6. A process according to claim 1 for the precipitation copolymerization of triallylamine or a triallylamine salt with another allyl or allyl salt co-monomer as hereinbefore defined to form a copolymer of quasispherical particles having a mean diameter from 0.5 to 10 microns wherein the reaction is carried out in a binary mixture consisting of water and acetone.

References Cited
UNITED STATES PATENTS
3,619,394   11/1971   Battaerd _____ 204—159.22
3,057,833   10/1962   Devlin _____ 260—78.5 R MURRAY TILLMAN, Primary Examiner
T. K. PAGE, Assistant Examiner U.S. Cl. X.R.
204—159.11; 260—80.3, 89.7; 204—159.15